United States Patent
Noetzold et al.

(10) Patent No.: US 9,553,526 B2
(45) Date of Patent: Jan. 24, 2017

(54) BYPASSED CASCADED CELL CONVERTER

(71) Applicant: DET International Holding Limited, George Town, Grand Cayman (KY)

(72) Inventors: Kilian Noetzold, Wuppertal (DE); Michael Bragard, Soest (DE); Karsten Fink, Werl (DE); Richard Griessel, Derry, NH (US); Ralf Wegener, Unna (DE)

(73) Assignee: DET INTERNATIONAL HOLDING LIMITED, George Town, Grand Cayman (KY)

( * ) Notice: Subject to any disclaimer, the term of this patent is extended or adjusted under 35 U.S.C. 154(b) by 204 days.

(21) Appl. No.: 14/162,455

(22) Filed: Jan. 23, 2014

(65) Prior Publication Data

US 2014/0204632 A1 Jul. 24, 2014

(30) Foreign Application Priority Data

Jan. 24, 2013 (EP) .................... 13405007

(51) Int. Cl.
*H02M 5/45* (2006.01)
*H02M 5/458* (2006.01)
(Continued)

(52) U.S. Cl.
CPC ............ *H02M 7/49* (2013.01); *H01F 30/04* (2013.01); *H02P 2101/15* (2015.01)

(58) Field of Classification Search
CPC ............ H02M 5/00; H02M 5/40; H02M 5/44; H02M 5/453; H02M 5/45; H02M 5/458; H02M 5/4585; H02M 2001/0067; H02M 2001/007; H02M 2001/0074; H02M 2001/0077; H02M 2001/008; H02M 2001/123; H02M 1/12; H02M 1/32; H02M 1/325; H02M 1/36; H02M 7/49; H02M 7/483; H02M 7/487; H02M 7/4826; H02M 2007/4835; H01F 30/04; H02P 2101/15
(Continued)

(56) References Cited

U.S. PATENT DOCUMENTS 6,229,722 B1 5/2001 Ichikawa et al.
6,301,130 B1 10/2001 Aiello et al.
(Continued)

FOREIGN PATENT DOCUMENTS

DE 19832226 A1 1/2000

OTHER PUBLICATIONS

English Translation (DE 19832226).*
(Continued)

*Primary Examiner* — Timothy J Dole
*Assistant Examiner* — Carlos Rivera-Perez
(74) *Attorney, Agent, or Firm* — Birch, Stewart, Kolasch & Birch, LLP (57) ABSTRACT

In a converter for converting energy from a generator to a power network, wherein the converter comprises multiple power modules, wherein each power module includes at least two power cells and a transformer for connecting the power cells to the power network, wherein each power cell includes a phase input, a phase output, a transformer output connected to the transformer, a rectifier circuit and an inverter, the transformer (T) of a power module (4.1, ..., 4.n) includes one generator-side winding (10) for each of the power cells (5) and exactly one common grid-side winding for balancing an energy flow through the power cells (5) of a power module (4.1, ..., 4.n).

22 Claims, 5 Drawing Sheets

(51) Int. Cl.
*H02M 7/49* (2007.01)
*H01F 30/04* (2006.01)
*H02P 101/15* (2015.01)

(58) Field of Classification Search
USPC ... 363/34–43, 50, 51, 55–58, 65–72, 95–99,
363/131–134; 323/205, 211, 222–226,
323/247–264, 266, 268–276, 282–286,
323/328–348, 351, 361, 901, 908;
318/376, 757–765, 801; 336/170, 171;
290/44
See application file for complete search history.

(56) References Cited

U.S. PATENT DOCUMENTS

| | | | |
|---|---|---|---|
| 2003/0223251 A1* | 12/2003 | Hammond | H02M 5/4585 363/35 |
| 2010/0213921 A1* | 8/2010 | Abolhassani | H01F 27/385 323/328 |
| 2011/0215890 A1 | 9/2011 | Abolhassani et al. | |

OTHER PUBLICATIONS

Baraia et al., "Efficiency Comparison between a Hybrid Cascaded Connected Seven Level Converter and a Standard Cascaded Connected Seven Level Converter for STATCOM . . . at 15 kV Utility Grids," 13th European Conference on Power Electronics and Applications, Sep. 8-10, 2009, 10 pages.

* cited by examiner

BYPASSED CASCADED CELL CONVERTER

TECHNICAL FIELD

The invention relates to a converter for converting energy from a generator to a power network, wherein a number of phases of the generator is at least two, the converter comprises multiple power modules, each power module includes at least two power cells and a transformer for connecting the power cells to the power network, each power cell includes a phase input, a phase output, a transformer output connected to the transformer, a rectifier and an inverter. Furthermore, the invention relates to a method for operating such a converter.

BACKGROUND ART

Especially due to the rapid technological development in the field of wind power applications, there is currently a high demand for sophisticated converter applications. In particular, power converters, which are able to transfer electric energy from generators with variable frequency and variable output voltage to medium-voltage grids with quasi-constant frequency and voltage in an efficient and reliable way are needed. To achieve these goals, converters with multiple power levels—so-called multi-level converters—can be used.

U.S. Pat. No. 6,301,130 describes a modular multi-level adjustable supply with parallel connected active inputs. This topology is designed to transfer energy from a power network to an electric machine.

SUMMARY OF THE INVENTION

It is the object of the invention to create a converter pertaining to the technical field initially mentioned, that offers a voltage scalability, that is comparably light-weight and highly reliable, that leads to a high converter availability, especially in wind power applications, that offers a straightforward maintainability and that is comparably low cost.

The solution of the invention is specified by the features of claim 1. According to the invention, in a converter according to the technical field mentioned above, the transformer of a power module includes—for balancing an energy flow through the power cells (5) of a power module (4.1, . . . , 4.n)—one generator-side winding for each of the power cells of that power module and exactly one common grid-side winding.

By providing a generator-side winding for each power cell but only one common grid-side winding for all of the power cells of a power module, the energy transfer through all of the power cells of a power module is balanced through that grid-side winding. Accordingly, none of the power cells has to bear the generators whole energy variation between zero and maximum energy. The energy variation may even be zero thereby practically eliminating the need for a DC link capacitor. Although the DC link capacitor usually is not completely eliminated in real implementations, it may be considerably reduced. This is of particular importance because such DC link capacitors become cheaper and smaller the lower their capacitance is. The balancing according to the invention therefore results in cheaper and smaller converters.

The generator is preferably a medium voltage generator which means that its output voltage typically is in the medium voltage range. For the purpose of this invention, the term medium voltage is to be understood as a medium voltage in electric power transmission and distribution systems which usually means a voltage in a range of about 1000 Volts to about 100'000 Volts.

The converter preferably is a frequency converter with a fixed nominal frequency and a fixed voltage and the power modules are in a preferred embodiment essentially identical. The inverter preferably has a B6 topology with IGBTs, and preferably a brake chopper.

Preferably, the rectifier is a passive rectifier such that the converter is adapted to transfer energy solely from the generator to the power network, i.e. the generator is restricted to a 2Q operation where no energy may be transferred from the power network to the generator.

As described above, the converter includes two or more power modules connected in series to the generator. Two or more series connected power cells are therefore provided for each generator phase. Accordingly, the voltage delivered by the generator is distributed to the series connected power cells such that each power cell has to bear only a part of the generator voltage. The number of power cells per phase is preferably chosen such that each power cell just has to bear a voltage in the range of about 50 Volts to 1000 Volts. This voltage range is designated as a low voltage in connection with this invention in accordance with the terminology often used in electric power transmission and distribution systems.

This configuration has the advantage that standardised low voltage components can be used instead of the mostly customised and therefore much more expensive medium voltage components.

Generally, the transformer may be configured in any suitable way which means that the windings may for example be wound around a magnetic core such as to achieve a common magnetic flux of the generator-side windings. Each or some windings of each power cell of a power module may generally be wound around a different section of the magnetic core of the transformer. But in order to enhance the balancing of the energy flow through the power cells, the transformer is preferably adapted for a high magnetic coupling between the generator-side windings.

This high magnetic coupling between the generator-side windings is preferably achieved in that the corresponding phase windings of each power cell of a power module are collectively wound around a common section of the magnetic core of the transformer. In case of for example three generator phases and three generator-side windings per power cell, the first phase of the first power cell, the first phase of the second power cell and the first phase of the third power cell are put together and commonly wound around the transformer core. Accordingly, the corresponding phases of the power cells of a power module are in close proximity to each other and wound around the same section of the magnetic core.

The corresponding phase windings of the power cells may thereby be put together in parallel (stacked) prior to their winding. But even better results regarding the magnetic coupling are achieved when the windings are twisted, where the term twisted windings shall also include braided windings.

Typically, each transformer comprises galvanic insulation of the maximal phase voltage of the generator between all generator-side windings and/or galvanic insulation of the maximal phase voltage of the grid between the grid-side windings and the generator-side windings. In a preferred embodiment, each transformer is adapted for a high magnetic coupling between the generator-side windings. Such a transformer design has the advantage to even better balance the energy transfer through the power cells of one power module in the magnetic path of the transformer core, especially at low generator frequency.

However, in practice the energy variation will not be zero, not even with a high coupling of the generator-side transformer windings. It is therefore preferred to provide a DC-link capacitor in each power cell to handle the remaining energy variation. The DC-link capacitor may however be minimal, preferably smaller than 2000 microFarad or even smaller than 100 microFarad.

In a preferred embodiment of the invention, the inverter is of a switching type, where IGBTs are used as controllable switches. The value of the DC-link capacitor depends on the IGBT switching frequency but not on the generator frequency. Depending on the IGBT switching frequency, the value of the DC-link capacitor may therefore also be chosen to be higher.

Preferably, the minimum necessary DC-link capacity $C_{min}$ is determined according to the following formula:

$$C_{min} = F * \frac{P}{\hat{U}_1 f_p} * \frac{1}{\Delta U_{max}} \quad (1)$$

where $\Delta U_{max}$ is a voltage rise of a voltage across the DC-link capacitor caused by switching pulses of the inverter, F is a factor having a value between about 0.1 and 0.5, preferably between 0.12 and 0.2, P is a power transferred by the power cell, $f_P$ is a switching frequency of the inverter and $\hat{U}1$ is an amplitude of a phase voltage at the transformer output.

As outlined above, the generator and the power network have multiple phases with at least two, for example four, five or even more phases. Whereas the number of phases of the transformer windings does not necessarily have to be the same, it is advantageous and therefore preferred that the number of phases of the power network, the number of phases of the grid-side winding and the number of phases of the generator-side windings is equal to the number of phases of the generator.

A widely-used standard for the number of phases of multiphase devices and networks is three. In a preferred embodiment of the invention, the number of phases of the generator is therefore three.

In a preferred embodiment, each transformer includes a three-phase grid-side winding in star connection (also known as Y connection) or triangular connection (also known as delta connection) and three generator-side windings in star connection or triangular connection. The grid-side and the generator-side windings may also be connected in zig-zag connection (also known as Z or inter-star connection).

In another preferred embodiment of the invention, each power cell includes a cut-off mechanism adapted for enabling a direct electrical connection between the phase input and the phase output of the power cell. In other words, the cut-off mechanism allows to bypass a power cell by short-circuiting it. The cut-off mechanism preferably includes a bidirectional bypass switch. The bypass switch is for example fail-safe and comprises at least one anti-parallel press-pack thyristor and/or at least one normally-on mechanical contactor, for enabling a direct electrical connection between the phase input and the phase output of the power cell. Each power module is preferably optimized for 2Q generator usage through the minimized capacitance of the DC-link capacitor. The passive rectifier circuit typically has a B4 configuration preferably realized with four thyristors or with two thyristors and two active switches to substitute the bypass switch.

The use of such a cut-off mechanism, in particular of such a bypass switch, has the advantage that one or more power cells can be short circuited temporarily in order to match the power output of the generator with the power demand of the power network and/or to drive each power cell in an optimal load region.

As previously described, each phase of the generator includes a series connection of multiple power cells. Such a series connection has the advantage that by varying the number of actively serially connected power cells—e.g. by short-circuiting and therefore inactivating a certain number of power cells—a voltage scalability of the converter is achieved. In typical embodiments, each phase of the generator includes more power cells than would technically be necessary under full load and a certain number of power cells are therefore deactivated during normal operation of the converter, for example by closing its bypass switch. However, in a preferred embodiment of the invention, these back-up power cells or redundancy power cells are configured to be instantaneously activated, for example by opening its bypass switch, in the case where an active power cell fails. Or in other words, a deactivated power cell is automatically activated upon failure of an active power cell. This has the advantage that reliability and availability of the converter are improved. In another preferred method, certain intact power cells are switched off during partial-load situation in order to enable the actively remaining power cells to operate in their respective optimal load regions.

In a preferred embodiment, the converter preferably includes a control system. This control system is for example used to control the power cells, i.e. for activating or deactivating the power cells. Accordingly, the control system is for controlling the cut-off mechanism of the power cells. The control system may however also fulfil further tasks such as for example communication and measurement tasks.

In a further preferred embodiment, one or more power cells include a local cell control system for controlling the respective power cell. In an even more preferred embodiment, all power cells include such a local cell control system. Controlling the power cell means controlling the controllable devices which for example include the switches of the inverter and also the cut-off mechanism as far as present. The local cell control system for example includes multiple gate drives for controlling the switches of the inverter and/or the cut-off mechanism.

The control system includes these local cell control systems. The use of such a local cell control system in each power cell has the advantage that each power cell is highly autonomous and that cell control commands, for example commands for opening and closing transistors, can be generated directly in the power cell. However, it is also possible that not each power cell has its own local cell control system and that, for example, one or more external control system (s) fulfil the control duties of the converter. It is also possible that a local cell control system of a power cell not only controls that power cell but also one or more other power cells. It is also possible that each power cell has its own local control system and that the control system additionally includes one or more control units as a part of the converter to control the power cells and/or other components of the converter. In a further preferred embodiment of the invention, the local cell control system is adapted to switch over from one power cell of a certain phase to another power cell of that phase by deactivating the one power cell and instantaneously at the same time activating the other power cell. This allows the provision of a real redundancy of the system. In case one of the active power cells of a certain phase fails, another power cell that has not been active so far can be activated immediately. Moreover, it is also possible to switch between power cells of the same phase during normal operation even if none of the power cells fails. By providing more power cells than necessary for maximum load and continuously switching between them, an equal operation time of each power cell can be achieved during operation of the converter. This power cell switching is possible due to the fact that the bypass switch is chosen to be very fast such that the bypass switch can be switched preferably in real time.

Another task of the control system may be to decide, how many power cells have to be active in a specific situation. If the generator produces a low output voltage, less power cells have to be active than if the generator produces a high output voltage. The term active power cell thereby denotes a power cell where the direct electrical connection between the phase input and the phase output is disabled, i.e. where the bypass switch is open.

The main parameter for determining the minimum number of active power cells in a phase is the generator voltage. The generator voltage usually is not constant but varies with the rotation speed of the generator. The minimum number of active power cells can then be determined as the current generator voltage divided by the voltage drop of a power cell. This voltage drop is also meant when using the term "blocking voltage" of a power cell below. This voltage drop sometimes is also denoted as the "withstand voltage" of a power cell. The ratio does usually not result in a natural number wherefore the minimum number is computed by adding 1 to the absolute value of this ratio.

Accordingly, the control system is preferably adapted to determine a minimum number of active power cells in dependency of the generator voltage and the voltage drop across each of the power cells.

In order to adequately control a power cell, it is advantageous that the local cell control system knows the energy transferred by the power cell. This energy largely corresponds to the current flowing through the power cell. Accordingly, a current measurement device may be placed somewhere ahead or after the power cell to measure the current in the lines leading to or from the power cell. In such a case the power cell would however require a further input for receiving the current values. In a preferred embodiment of the invention, the local cell control system of each power cell therefore includes a sensor device for sensing the current through the power cell. In a particularly preferred embodiment, the sensor device is adapted to sense the output current of the power cell. The sensor device preferably includes at least one sensor, usually it includes at least one sensor for each output phase of the power cell. And since the voltage of each power cell typically does not exceed the low voltage range, the sensor or sensors used are preferably isolated for the low voltage range.

In a preferred embodiment, each power cell includes a power supply because each cell needs energy for example to operate the control system and the switches. The power supply is preferably powered either by a voltage drop across the DC-link capacitor and/or by a voltage drop across the bypass switch.

Compared to an external power supply, this solution has the advantage that separate galvanic isolation for an external power supply unit is not necessary. However, it is of course also possible to use external power supply units for powering the power cells. Such power supply units external to the power cell have to be connected to the power cell and may for example be powered either by the generator or the power network. An auxiliary transformer may in both cases be used to power the external supply unit.

In a preferred embodiment, each power cell includes a charging device for pre-charging the DC-link capacitor of the power cell during a start-up phase of the converter. This has the advantage to further improve the autonomy of each power cell and to ensure its power supply. The charging device may be realised as a separate unit. But preferably the local cell control system and the power supply are adapted for pre-charging the DC-link capacitor where the pre-charging control is for example implemented by means of software stored in a memory of the control system. The pre-charging during the start-up phase of the converter is then executed by controlling the switches in a suitable way.

It is, however, also possible to install a central charging circuit for all power cells of the converter or one central charging circuit for all power cells of each power module.

In a preferred embodiment, the phase inputs of all power cells of each power module are directly connected to the respective phase outputs of the power cells of a preceding power module, or to the generator in the case where the power module is a first power module. This has the advantage that the design of the converter is comparably simple and control of the different power cells is straightforward. However, it would also be possible to arrange for a different interconnection strategy of the different power cells. The term "first power modules" is to be understood as "first power module in line of a series connection of power modules between a generator and a termination node, seen from the generator".

Accordingly, the phase inputs of the power cells of the first power module are connected to the generator in a triangular connection. The phase inputs may however also be connected to the generator in star connection.

In a preferred embodiment, the phase outputs of all power cells of each power module are directly connected to the respective phase inputs of the power cells of a following power module, or to a common termination node in the case where the power module is a last power module. This has the advantage that the design of the converter is comparably simple and control of the different power cells is straightforward. However, it would also be possible to arrange for a different interconnection strategy of the multiple power cells. The term "last power modules" is to be understood as "last power module in line of a series connection of power modules between a generator and a termination node, seen from the generator".

Accordingly, the phase outputs of the power cells of the last power module are connected to the common termination node in a triangular connection.

In a typical embodiment, the converter includes a control architecture with a communication link or communication bus, preferably an optical fibre network, wherein the communication link connects the local cell control system of at least one power cell to the local cell control system of at least one other power cell. Preferably all local cell control systems interconnected via the communication link. The advantage of such a control architecture with communication link is that an easy and straightforward communication between different power cells. The communication link can also be omitted and/or be replaced by a wireless network or the like.

In a preferred embodiment, the control architecture includes a central supervision unit, wherein the central supervision unit is preferably connected to the local cell control system of at least one power cell via the communication link. It is particularly preferred that the central supervision unit, the local cell control systems and the communication link together form the control architecture. It is of course also possible that the control architecture further comprises other components like for example sensors and/or connection points. The central supervision unit is typically configured to control each local cell control system in respect to optimal current sharing, optimal interleaving and optimal operating hours of each power cell. For this purpose, the central supervision unit typically comprises a software which is configured to monitor the status of all power cells and/or power modules of the converter and which comprises a control algorithm adapted to optimize the overall performance of the generator, preferably by sending switching commands to the power cells and/or the power modules.

In a preferred embodiment, at least one of the generator-side windings of at least one of the transformers is configured to be used as an inductive filter element at the transformer output of the inverter of the respective power cell. This leads to a reduction of overall weight, power losses and cost of the converter. It is, however, also possible to arrange for an inductive filter element that is separate from the transformer.

In a preferred embodiment, at least one of the power cells includes an additional energy storage, preferably a battery, which can be either a rechargeable or a non rechargeable battery. Such an additional energy storage has the advantage to allow for grid buffering and also to allow for a timely decoupled generation and feed-in of energy. Decentralized low- and mid-term energy buffering is advantageous in terms of grid stability. In a typical embodiment, the additional energy includes a DC-DC converter for connecting the battery to the rest of the power cell. The additional energy storage is preferably connected in parallel to the DC-link capacitor of the power cell.

The solution of the invention regarding the method for operating the converter is specified by the features of claim 18.

In a converter for converting energy from a generator to a power network, where the converter includes multiple power modules where each power module includes at least two power cells and a transformer for connecting the power cells to the power network and where each power cell includes a phase input, a phase output, a transformer output connected to the transformer, a rectifier and an inverter, the method according to the invention includes the step of balancing an energy flow through the power cells of a power module by providing the transformer of the power module with one generator-side winding for each of the power cells of the power module and exactly one common grid-side winding and balancing the energy flow through the common grid-side winding.

In a preferred embodiment of the invention, a cut-off mechanism is controlled for activating or deactivating a power cell. Controlling the cut-off mechanism thereby includes enabling or disabling a direct electrical connection between the phase input and the phase output of the power cell. By enabling or disabling this direct electrical connection the power cell can be activated or deactivated in a controlled way.

As previously described, the direct electrical connection between the phase input and the phase output is preferably enabled or disabled by means of a bypass switch.

In another preferred method according to the invention, the bypass switches of at least one of the power cells of a converter according to the invention are controlled by the previously mentioned central supervision unit and/or at least one of the local cell control systems of a power module. In such a method, single or multiple power modules and/or power cells are typically continuously enabled and/or disabled—in other words switched on and off—depending on the actual system needs of the converter. Such a controlled switching depending on the actual system needs has multiple advantages. For example, appropriate switching can be used to guarantee that sufficient DC-link voltage is attained at least in one power cell to feed in energy, to enable higher efficiency during partial load by short-circuiting selected power cells—assuming the conduction losses of the bypass switches are lower compared to the overall operation losses of the power cells—and to allow an interleaved operation of the inverter part of corresponding cells resulting in reduced harmonics in the grid. In a typical method, an operation hour information is continuously updated and stored for each power cell. This has the advantage that similar aging effects in all power cells can be achieved and the overall lifetime of the converter can thus be maximized. A further advantage of the controlled switching of the bypass switches is that it can be used to ensure an equal power transfer through all active power cells during operation of the converter.

One of the main criteria for enabling or disabling a power cell is the generator voltage or—which is closely related thereto—a rotation speed of the generator. It is accordingly further preferred that controlling the cut-off mechanism is performed in dependency of the generator voltage or the rotation speed of the generator.

The generator voltage or the rotation speed of the generator are for example determined by the central supervision unit and/or at least one of the local cell control systems. Based on the generator voltage or the rotation speed of the generator it is determined which bypass switch should be closed or opened at which moment. This has the advantage that the switching of the bypass switches can—at least to a certain extent—be matched with the actual power production of the generator. However, it is also possible to take into account other parameters for this, for example the actual generator output currents in one or more phase(s).

Other advantageous embodiments and combinations of features come out from the detailed description below and the totality of the claims.

BRIEF DESCRIPTION OF THE DRAWINGS

The drawings used to explain the embodiments show:

FIG. 6: a schematic winding diagram of the transformer shown in FIG. 5, FIG. 7 a schematic diagram of the relation between the DC link capacitance and the voltage ripple caused by the switching of the inverter of the power cell and FIG. 8 a schematic diagram of the voltage across a DC link capacitor for a specific value of the DC link capacitance.

In the figures, the same components are given the same reference symbols.

PREFERRED EMBODIMENTS

Figure 1:
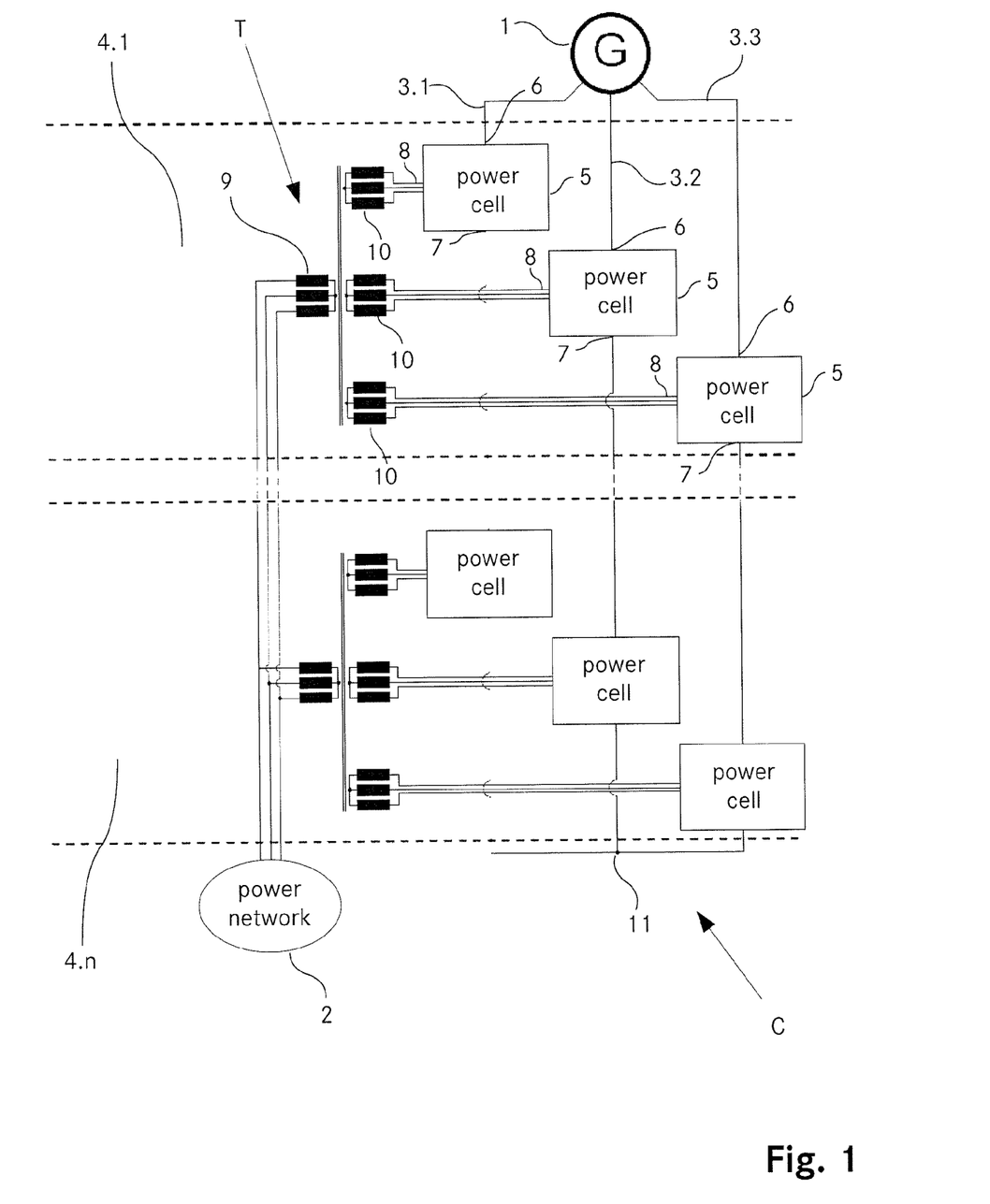
FIG. 1: A schematic wiring diagram of a converter according to the invention.

FIG. 1 shows a schematic wiring diagram of a converter C according to the invention. The converter C is connected between a three-phase generator 1 and a power network 2. The converter C comprises three phases 3.1, 3.2 and 3.3, each of which being connected to a corresponding phase connection of the generator 1. The converter C comprises n power modules 4.1, ..., 4.n, of which only the first one and the last one are shown in FIG. 1. Each power module is typically configured to function in pure 2Q-generator usage. Each power module 4.1, ..., 4.n comprises three power cells 5, wherein each of these power cells 5 is electrically tied into one of the phases 3.1, 3.2 and 3.3. Each phase 3.1, 3.2, 3.3 enters the corresponding power cell 5 at a phase input 6 of the corresponding power cell 5 and exits it at a phase output 7 of the corresponding power cell 5.

Each power cell 5 comprises a transformer output 8 via which each power cell 5 is connected to a corresponding generator-side winding 10 of a transformer T. Each power module 4.1, ..., 4.n includes one transformer T. Each transformer T comprises one grid-side winding 9 and three generator-side windings 10. The embodiment of the invention shown in FIG. 1 having a three-phase configuration, three generator-side windings are needed, one for each phase 3.1, 3.2 and 3.3. Accordingly, in multi-phase configurations with more than three phases or yet only two phases, the number of generator-side windings would have to be chosen accordingly.

The phase outputs 7 of the three power cells 5 of the last power module 4.n are connected together in a common termination node 11. The phase outputs 7 of all other power cells 5 are connected to the phase inputs of the corresponding power cells 5 of the subsequent power modules 4.1, ..., 4.n. In this way, a series connection of n power cells 5 is achieved for each phase 3.1, 3.2, 3.3.

The topology of the converter C thus consists of a series connection of power modules 4.1, ..., 4.n. Three power cells 5 and one multi-winding transformer T form each power module 4.1, ..., 4.n. The grid side of all transformers T is connected in parallel. Each generator phase 3.1, 3.2, 3.3 is operated by multiple identical power cells 5 in series. A variation of the number of power modules 4.1, ..., 4.n in series results in a modular voltage scalability. The minimal number $n_{ser\_min}$ of power modules 4.1, 4.n in series is defined by the maximal phase voltage $V_{ph\_max}$ of the generator 1 and the maximum blocking voltage $V_{cell\_max}$ of a power cell 5 according to Eq. 1.

$$n_{ser\_min} = abs(V_{ph\_max}/V_{cell\_max}) \qquad \text{Eq. 1}$$

Within a three phase system the total number of power modules 4.1, ..., 4.n is given by Eq. 2.

$$n\text{total} = 3 * n\text{ser\_min} \qquad \text{Eq. 2}$$

Figure 2:
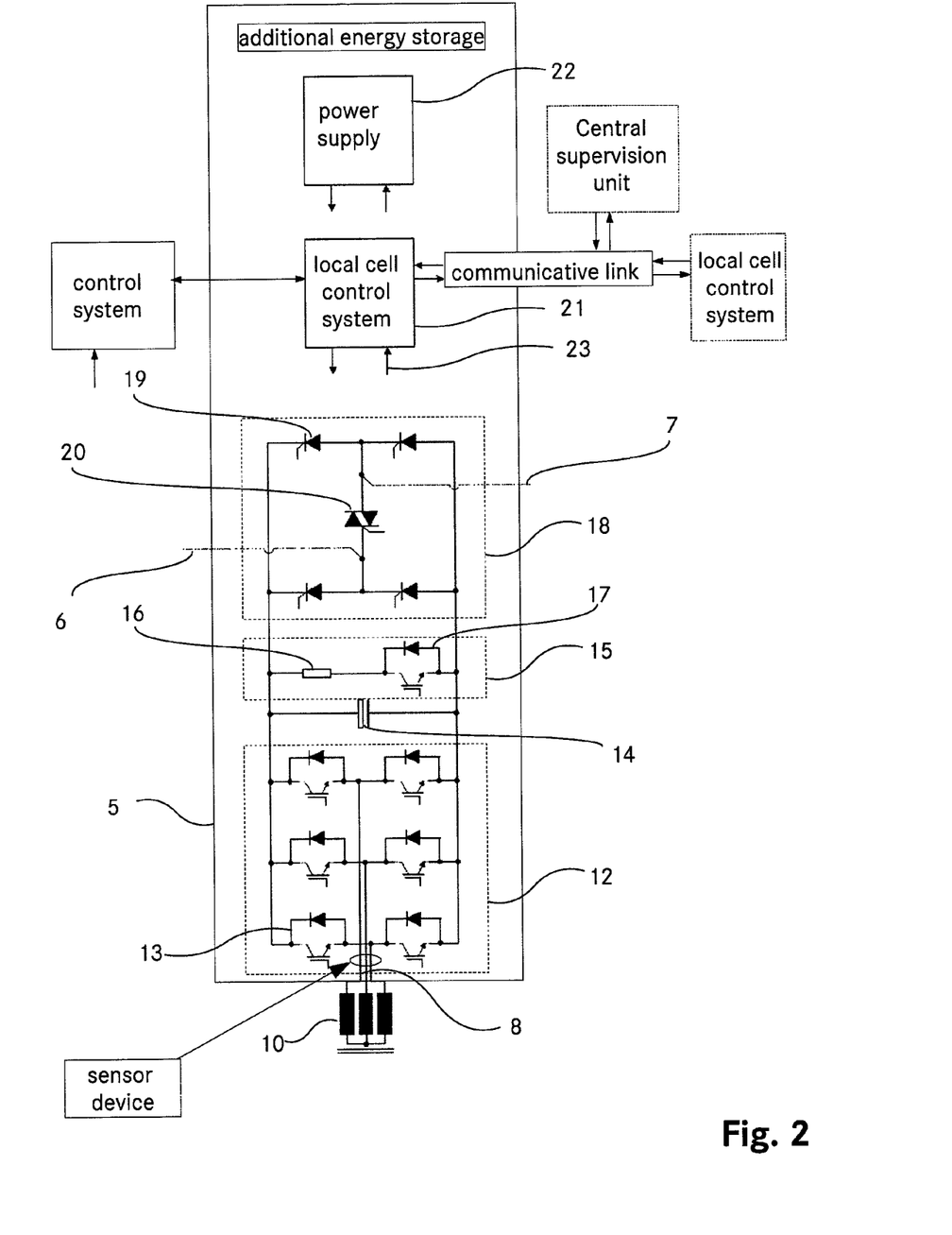
FIG. 2: a schematic wiring diagram of a power cell according to the invention.

FIG. 2 shows a schematic wiring diagram of a power cell 5 according to the invention. The phase input 6 and the phase input 7, through which the power cell 5 can be linked to the power cells 5 of other power modules 4.1, ..., 4.n via the phases 3.1, 3.2 and 3.3, are shown in FIG. 2. Furthermore, the transformer output 8 for linking the power cell to the corresponding generator-side winding 10 is shown in FIG. 2.

The power cell 5 comprises an inverter 12 with six inverter switches 13. The power cell 5 further comprises a DC-link capacitor 14 and a brake 15, connected in parallel. The brake 15 comprises a brake resistor 16 and a brake chopper 17 connected in series. Furthermore, the power cell 5 includes a rectifier 18. The rectifier 18 comprises four rectifier switches 19 and a bidirectional bypass switch 20. The bypass switch 20 can be either a semiconductor, e.g. an anti-parallel thyristor (triac), or a mechanical contactor. The bypass switch 20 electrically separates the phase input 6 and the phase output 7 from each other. When the power cell 5 is active, the bypass switch 20 is open, i.e. no electrical connection between the phase input 6 and the phase output 7 is established. To deactivate the power cell 5, the bypass switch 20 is closed, i.e. an electrical connection between the phase input 6 and the phase output 7 is established and the power cell 5 is thus short-circuited or bypassed. The rectifier 18 is designed for variable input frequency from the generator 1 (typically 8-70 Hz). In the particular embodiment of the invention shown in FIG. 2, The rectifier switches 19 are thyristors. During normal operation, the thyristors of the rectifier 18 are operated as diodes. This means, they are in on-state during the full electric period. During a start-up sequence of the converter C and/or the power module 4.1, ..., 4.n and or the power cell 5, the rectifier 18 charges the DC-link capacitor 14. This is done smoothly via a phase controlled modulation of the thyristors.

In further, the power cell 5 depicted in FIG. 2 includes a local cell control system 21 for controlling the inverter 12, the brake 15, the rectifier 18—in particular their switches 13, 19 and brake chopper 17—as well as the bypass switch 20. Furthermore, the power cell 5 includes a power supply 22. Each power cell 5 requires such an individual low voltage power supply 22 that provides energy for the cell control and—for example the switching of the inverter switches 13 and the brake chopper 17, which are typically transistors, preferably IGBTs. In particular, a power supply is then needed for the IGBT drivers. Preferably, all used IGBTs are low voltage types (e.g. 1700 V), which is advantageous is terms of relative conduction losses and price. The power supply 22 typically draws its input power from the DC-link capacitor 14 and/or the forward voltage drop at the bypass switch 20. In any case, the power supply 22 is configured to guarantee an uninterrupted power supply to the power cell 5, in particular during all failure modes.

Figure 3:
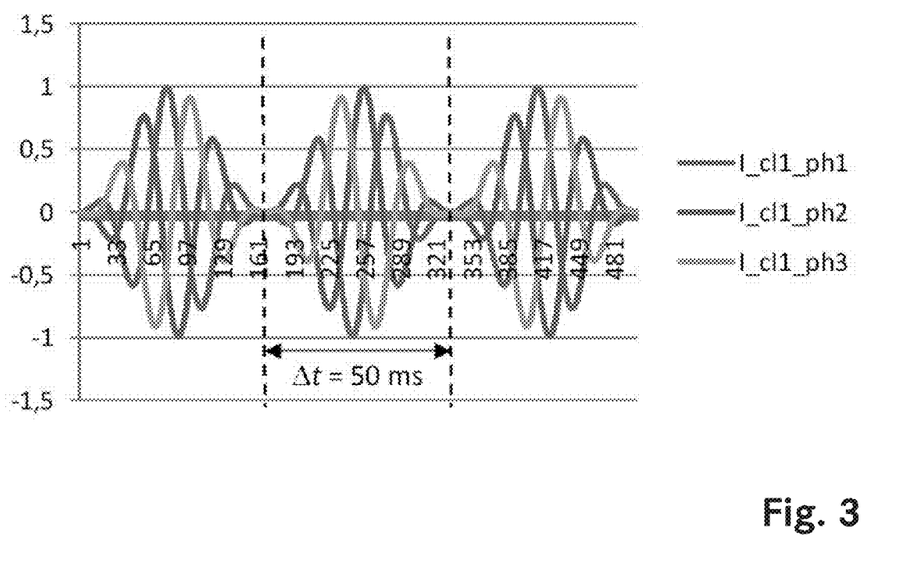
FIG. 3: a current diagram visualizing the principle of work of the invention (low generator frequency)
Figure 4:
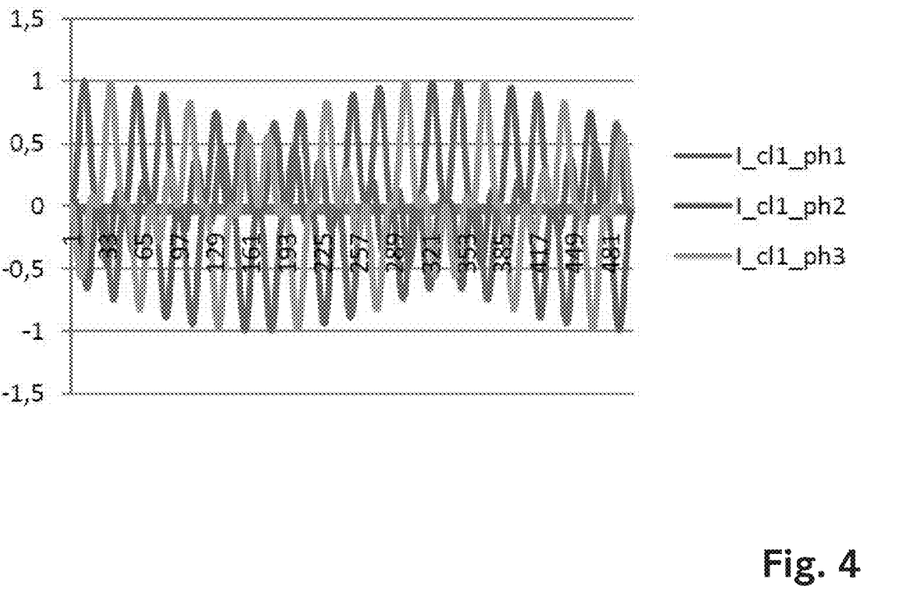
FIG. 4: a current diagram visualizing the principle of work of the invention (high generator frequency)

For power cells having a power of 400 kiloWatt, the elements shown in FIG. 2 can for example be chosen as follows:
- inverter switches 13: IGBT (e.g. Infineon FF450R17ME4)
- DC-link Capacitor 14: 1250 microFarad
- brake resistor 16: 1 ohm, 1000 ampere for 1 second
- rectifier switches 19: thyristor (e.g. Infineon TT150N)
- bypass switch 20: 2 anti-parallel thyristors FIGS. 3 and 4 show current diagrams visualizing the principle of work of the invention for low generator frequencies (FIG. 3) and high generator frequencies (FIG. 4). Each power cell 5 (see FIGS. 1 and 2) modulates the constant frequency of the power network 2 (see FIG. 1) or grid (e.g. 50 or 60 Hz) with its variable input frequency from the generator 1 (e.g. 8-70 Hz, see FIG. 1). Depending on the frequency ratio between the generator frequency $f_{gen}$ and the grid frequency $f_{grid}$ the resulting currents from a power cell to the corresponding windings of the transformer look different. FIG. 3 and FIG. 4 show exemplarily the resulting output currents $I_{cll\_ph1}$, $I_{cll\_ph2}$ and $I_{cll\_ph3}$ of one power cell 5 for a grid frequency of 50 Hz and generator frequencies of 10 Hz (FIG. 3) and 70 Hz (FIG. 4). Each current is free of any DC component—which is mainly a result of the DC-link capacitor—and the sum of all three currents is zero at each time.

It shall be understood that the current diagrams in FIGS. 3 and 4 show the output currents at the transformer outputs 8 (see FIGS. 1 and 2) of one out of three power cells 5 of one of the n power module 4.1, . . . , 4.n. The currents of both other power cells 5 of each particular power module 4.1, . . . , 4.n are each 120° phase shifted. The continuous power from the generator 1 is equally but 120° time-shifted distributed over the three generator phases. The resulting low frequency high power loop is closed in the magnetic path of each multi-winding transformer T. At each time, the instantaneous output power of one power cell 5 corresponds exactly to the power that is delivered at its inputs clamps, i.e. its phase input 6 and its phase output 7. Therefore, the DC-link capacitor 14 buffers only asymmetric grid voltages and tolerances of components. This procedure ensures a continuous energy flow into the power network 2 without buffering low frequency energy in the DC-link capacitor 14. The comparably small size of the required DC-link capacitor 14 of each power cell 5 forms one of the main benefits of this topology.

The above explanations make it clear that each power cell 5 of the converter C (see FIGS. 1 and 2) can be individually bypassed, which means a direct electric connection between the phase input 6 and the phase output 7 of each power cell 5 by closing the bypass switch 20. All three bypass switches 20 of one power module 4.1, . . . , 4.n are typically closed and opened simultaneously. This bypass can be used in two ways:

1. Increase reliability and availability by adding redundancy

Especially in wind power applications—one main target area for the converter C according to the invention—the reliability and availability demands increase significantly from onshore to offshore application. Here, the invention offers the opportunity to adjust the ratio between price and reliability in a wide range without additional development. In case of a failure inside a power cell 5, this power cell 5 and all power cells 5 of the same power module 4.1, . . . , 4.n are typically bypassed. If the bypass switch 20 itself fails, the design of this bypass switch 20 (e.g. anti-parallel press-pack thyristors or normally-on mechanical contactors) ensures, that it breaks into a short circuit. Using this method, the converter C can operate with reduced power, if a power cell 5 is inoperable. The introduction of additional power cells 5, enables redundancy and skips this power limitation. During normal operation, some power module 4.1, . . . , 4.n are bypassed. These power modules 4.1, . . . , 4.n, in particular their power cells 5, are activated in case of a failure and the converter C can still operate at rated power. An n+x redundancy becomes possible, if x additional power modules 4.1, . . . , 4.n are inserted, resulting in $n_{ser\_min}$+x power modules 4.1, 4.n and 3*($n_{ser\_min}$+x) total power cells 5.

2. Increase efficiency in partial-load operation

Assuming the generator 1 is a permanent magnet or a constant exited synchronous machine, the output voltage depends on the rotation speed. Therefore, the required blocking voltage of the converter C is reduced during partial-load operation. This fact is used to turn-off some power cells 5. The dynamic usage of the bypass option can lower the overall losses of the converter C in this operation point. In order to allow such system management, the conduction losses of the bypass switches 20 are significantly lower than the cumulated losses of an active power cell 5.

Figure 5:
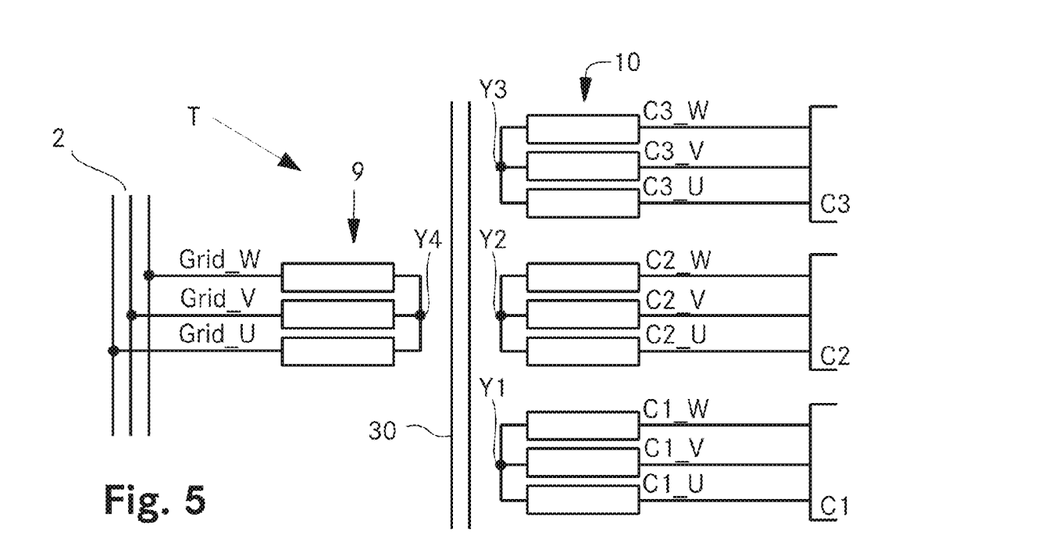
FIG. 5: a more detailed schematic depiction of the transformer of a power module.

FIG. 5 shows the transformer T of a power module in more detail. The transformer T includes the common grid-side winding 9 that are connected to the power network 2, the magnetic core 30 and the generator-side winding 10 that are connected to the power cells of a power module.

Again, the power module includes three power cells C1, C2, C3, where each of the power cells C1, C2, C3 provides three phases at its transformer output. Each phase of the first cell C1 is connected to a winding C1_U, C1_V and C1_W which are wound around the magnetic core 30 and connected in a Y connection to star point Y1. Similarly, each phase of the second cell C2 is connected to a winding C2_U, C2_V and C2_W, wound around the magnetic core 30 and connected in a Y connection to star point Y2 and each phase of the third cell C3 is connected to a winding C3_U, C3_V and C3_W, wound around the magnetic core 30 and connected in a Y connection to star point Y3.

The grid-side winding 9 also includes three phase windings Grid_U, Grid_V, Grid_W that wound around the magnetic core 30 and connected to the corresponding phases of the power network 2. Whereas the windings Grid_U, Grid_V, Grid_W are also shown to be connected in a Y connection to star point Y4, they could also be connected in triangular (also referred to as delta) connection.

Figure 6:
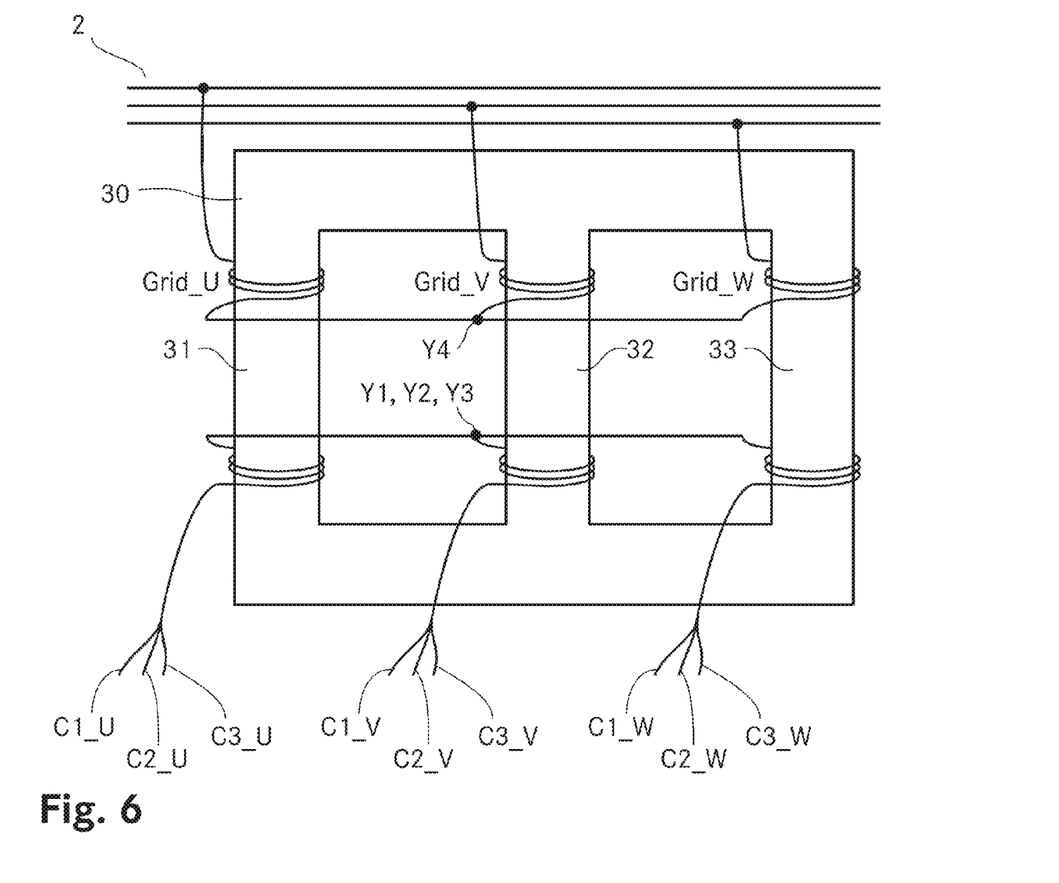

Now, FIG. 6 shows how the primary and secondary windings of the transformer T are wound around the magnetic core 30 in order to achieve a high magnetic coupling as outlined above.

The magnetic core 30 is shown to be an 8-shaped core which may be assembled by either E-, I- or U-type core parts or also any other suitable core part. The first phase windings C1_U, C2_U and C3_U of each of the three power cells C1, C2, C3 are twisted and collectively wound around the first leg 31 of the magnetic core 30. The twisted phase windings C1_U, C2_U and C3_U are shown schematically in that they are combined in FIG. 6 to a single line that is wound around leg 31.

Similarly, the second phase windings C1_V, C2_V and C3_V are twisted and collectively wound around the second leg 32 and the third phase windings C1_W, C2_W and C3_W are twisted and collectively wound around the third leg 33 of the magnetic core 30.

The other ends of the phase windings C1_U, C2_U, C3_U, C1_V, C2_V, C3_V, C1_W, C2_W and C3_W are connected to the star points Y1, Y2 and Y3 as shown in FIG. 5. However, for reasons of clarity only one spot Y1, Y2, Y3 is shown in FIG. 6 to designate the three star points.

On the grid-side of the transformer, the first phase winding Grid_U is wound around the first leg 31 of the magnetic core 30, the second phase winding Grid_V is wound around the second leg 32 and the third phase winding Grid_W is wound around the third leg 33. All three phase windings are connected to the star point Y4.

Collectively winding or twisting the corresponding phase windings of the cells of a power module does not present any problems regarding insulation because the all have a similar voltage level. However, as already mentioned above, insulation is an issue between the primary and the secondary windings of the transformer because the insulation should block the generator voltage. Accordingly, the cell phase windings are insulated with respect to the grid-side phase windings by a medium voltage insulation.

The voltage ripple across the DC-link capacitor depends on different factors but—apart from being influenced by the generator's low frequency component—is mainly caused by the switching frequency of the converter switches. Accordingly, the capacitance of the DC-link capacitor has to be chosen such that it may handle the resulting voltage ripple across it but should generally be chosen to be as small as possible as outlined above.

Figure 7:
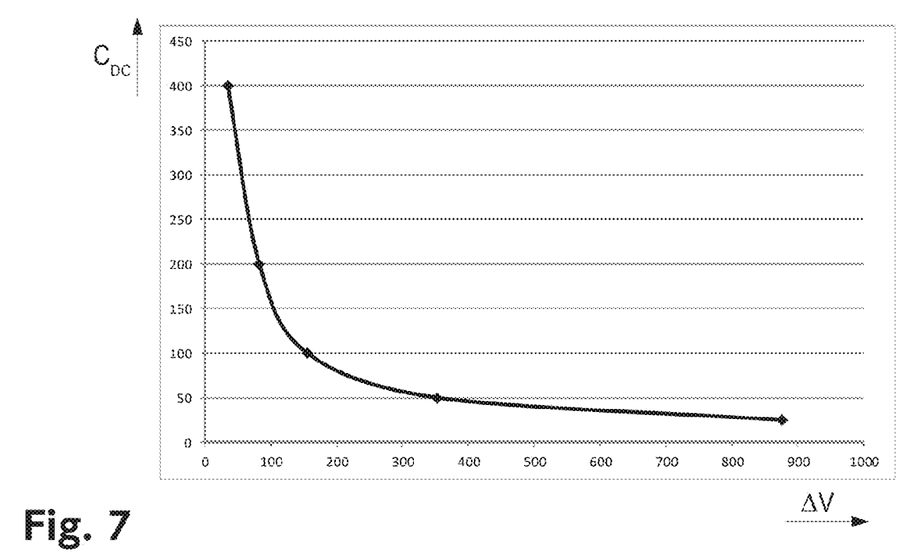

FIG. 7 shows for a specific operating point of a specific example a schematic diagram of the relation between the DC link capacitance and the voltage ripple as obtained by a simulation. In this example, the output power of the power cell is 250 kW, the switching frequency of the IGBTs of a power cell is 5 kHz, the generator frequency is 10 Hz, the grid frequency is 50 Hz and the generator current (RMS=root mean square) is 190 A.

The following table shows the resulting voltage ripple (Δ V) caused by the switching frequency for different values of the DC link capacitance ($C_{DC}$) of the DC-link capacitor:

| $C_{DC}$ in µF | ΔV in V |
|---|---|
| 25 | 876 |
| 50 | 353 |
| 100 | 156 |
| 200 | 83 |
| 400 | 35 |

As can be seen, for higher capacitance values the resulting ripple only slowly increases when the capacitance is substantially decreased but for smaller capacitance values the ripple substantially increases when the capacitance is only slightly decreased.

For a given configuration, determining the minimum DC-link capacity in dependency of the inverters switching frequency according to formula (I) above results in a graph that is similar to the one shown in FIG. 7. In order to determine the minimum DC-link capacity first the acceptable and/or specifiable maximum voltage rise $\Delta U_{max}$ of the DC-link voltage caused by the switching pulses is determined. Then $C_{min}$ is determined based on $\Delta U_{max}$ and on the other parameters as outlined in connection with formula (I) above. Accordingly, P is the power transferred by a power cell, $f_P$ is the switching frequency of the transformer side inverter and Û1 is the amplitude of the cell output phase voltage that is equivalent to the generator side transformer voltage. With a voltage of 400 $V_{rms}$ line-line Û1 is for example 325 V.

The factor F has been derived theoretically and has been found to have the following value $$F = \frac{4\sqrt{3} - 3}{24}$$

which is about 0.16. However, as this is a theoretical value the value for actually determining $C_{min}$ can also be chosen to differ from this value. To be on the safe side, the value of factor F should be chosen to be higher than the theoretical value.

Figure 8:
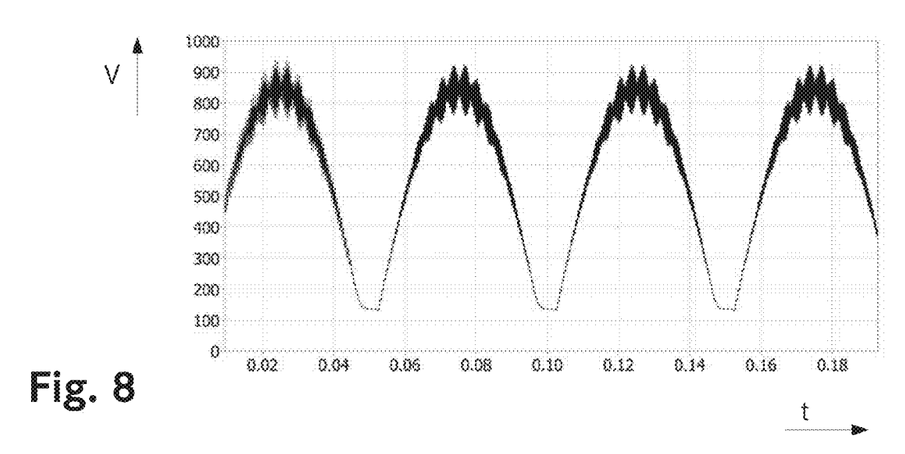

The resulting variation of voltage V with time t for a DC link capacitance of 100 microFarad is shown in FIG. 8 as obtained by a simulation. As can be seen, the voltage across the capacitor oscillates between about 150 V and 850 V with a switching frequency related ripple voltage of about 156 V (as already shown in FIG. 7).

It is to be noted that in the above embodiment, the invention is described for three-phase generators and three-phase grid application (as shown in FIG. 1). From a technical viewpoint, this limitation is not required. The number of grid and generator phases can be adjusted independently (e.g. for multiphase generators with more or less than three phases).

The invention claimed is:

1. Converter for converting energy from a generator to a power network, comprising:
    a frequency converter, wherein
    a) a number of phases of the generator is at least two,
    b) the converter comprises multiple power modules,
    c) each power module includes at least two power cells and a transformer for connecting the power cells to the power network,
    d) each power cell includes a phase input, a phase output, a transformer output connected to the transformer, a rectifier, a DC-link capacitor and a switching type inverter,
    e) for balancing an energy flow through the power cells of a power module, the transformer of the power module includes one generator-side winding for each of the power cells of that power module and exactly one common grid-side winding, and
    f) a capacity $C_{min}$ of the DC-link capacitor is determined according to the formula $$C_{min} = F * \frac{P}{\hat{U}_1 f_p} * \frac{1}{\Delta U_{max}}$$

where $\Delta U_{max}$ is a voltage rise of a voltage across the DC-link capacitor caused by switching pulses of the inverter, F is a factor having a value between about 0.1 and 0.5, P is a power transferred by a power cell, $f_P$ is a switching frequency of the inverter and Û1 is an amplitude of a phase voltage at the transformer output.

2. Converter according to claim 1, wherein the transformer is adapted for a high magnetic coupling between the generator-side windings in that corresponding phase windings of each power cell of a power module are collectively wound around a common section of a magnetic core of the transformer, where the corresponding phase windings are preferably twisted.

3. Converter according to claim 1, where F has a value between 0.12 and 0.2.

4. Converter according to claim 1, wherein the number of phases of the grid-side winding and the number of phases of the generator-side windings is equal to the number of phases of the generator.

5. Converter according to claim 4, wherein the number of phases of the grid-side winding as well as the number of phases of the generator-side windings is three and in that the phases of the grid-side winding and the generator-side windings are connected either in star connection or triangular connection.

6. Converter according to claim 1, wherein each power cell includes a cut-off mechanism, preferably a bypass switch, for enabling a direct electrical connection between the phase input and the phase output of the power cell.

7. Converter according to claim 1, wherein the converter includes a control system where one or more power cells include a local cell control system for controlling the respective power cell and where the control system includes the local cell control systems.

8. Converter according to claim 7, wherein the control system is adapted to determine a minimum number of active power cells in dependency of a generator voltage and a voltage drop across each of the power cells.

9. Converter according to claim 7, wherein the local cell control system includes a sensor device for sensing an output current of the power cell.

10. Converter according to claim 7, wherein the local cell control system and a power supply are adapted for pre-charging the DC-link capacitor of the power cell during a start-up phase of the converter.

11. Converter according to claim 7, wherein the converter includes a control architecture with a communication link, wherein the communication link connects the local cell control system of at least one power cell to the local cell control system of at least one other power cell.

12. Converter according to claim 11, wherein the control architecture includes a central supervision unit, wherein the central supervision unit is preferably connected to the local cell control system of at least one power cell via the communication link.

13. Converter according to claim 1, wherein each power cell includes a power supply powered by one or more of
   a) a voltage drop across the DC-link capacitor,
   b) a voltage drop across a bypass switch
   c) or an additional supply device external to the power cell and connected to the power cell, wherein the additional supply device is in particular powered either by the generator or the power network.

14. Converter according to claim 13, wherein a local cell control system and the power supply are adapted for pre-charging the DC-link capacitor of the power cell during a start-up phase of the converter.

15. Converter according to claim 1, wherein the phase inputs of all power cells of each power module are directly connected to the respective phase outputs of the power cells of a preceding power module, or to the generator in the case where the power module is a first power module.

16. Converter according to claim 1, wherein the phase outputs of all power cells of each power module are directly connected to the respective phase inputs of the power cells of a following power module, or to a common termination node in the case where the power module is a last power module.

17. Converter according claim 1, wherein at least one of the generator-side windings of at least one of the transformers is configured to be used as an inductive filter element at the transformer output of the inverter of the respective power cell.

18. Converter according claim 1, wherein at least one of the power cells includes an additional energy storage, preferably a battery.

19. Method for operating a converter for converting energy from a generator to a power network, the converter comprising:
   a) multiple power modules,
   b) where each power module includes at least two power cells and a transformer for connecting the power cells to the power network,
   c) and where each power cell includes a phase input, a phase output, a transformer output connected to the transformer, a rectifier and a switching type inverter,
   d) a DC-link capacitor, with a capacity Cmin of the DC-link capacitor being determined according to the formula $$C_{min} = F * \frac{P}{\hat{U}_1 f_p} * \frac{1}{\Delta U_{max}}$$

where $\Delta U_{max}$ is a voltage rise of a voltage across the DC-link capacitor caused by switching pulses of the inverter, F is a factor having a value between about 0.1 and 0.5, P is a power transferred by a power cell, $f_p$ is a switching frequency of the inverter and $\hat{U}1$ is an amplitude of a phase voltage at the transformer output,
   e) balancing an energy flow through the power cells of a power module by providing the transformer of the power module with one generator-side winding for each of the power cells of the power module and exactly one common grid-side winding and balancing the energy flow through the common grid-side winding.

20. Method according to claim 19, further including the step of controlling a cut-off mechanism for activating or deactivating a power cell, where controlling the cut-off mechanism includes enabling or disabling a direct electrical connection between the phase input and the phase output of the power cell.

21. Method according to claim 20, wherein the step of controlling the cut-off mechanism in dependency of a generator voltage or a rotation speed of the generator.

22. Method according to claim 20, wherein a deactivated power cell is automatically activated upon failure of an active power cell or in that an activated power cell is deactivated and instantaneously a deactivated power cell is activated.

* * * * *